(12) United States Patent
Berdugo et al.

(10) Patent No.: US 11,335,209 B2
(45) Date of Patent: May 17, 2022

(54) SYSTEM AND METHODS FOR PERFORMING A VISUALLY-IMPAIRED TRANSACTION

(71) Applicant: Mastercard International Incorporated, Purchase, NY (US)

(72) Inventors: Andrea Catalina Berdugo, Maryland Heights, MO (US); Christopher T. Scholl, Saint Peter's, MO (US)

(73) Assignee: Mastercard International Incorporated, Purchase, NY (US)

( * ) Notice: Subject to any disclaimer, the term of this patent is extended or adjusted under 35 U.S.C. 154(b) by 223 days.

(21) Appl. No.: 16/662,323

(22) Filed: Oct. 24, 2019

(65) Prior Publication Data

US 2021/0125522 A1    Apr. 29, 2021

(51) Int. Cl.
| | | |
|---|---|---|
| *G09B 21/00* | (2006.01) | |
| *G06Q 30/06* | (2012.01) | |
| *G06F 3/16* | (2006.01) | |
| *G06F 3/147* | (2006.01) | |
| *G06Q 20/20* | (2012.01) | |

(52) U.S. Cl.
CPC .......... *G09B 21/006* (2013.01); *G06F 3/147* (2013.01); *G06F 3/167* (2013.01); *G06Q 20/20* (2013.01); *G06Q 30/06* (2013.01); *G09B 21/008* (2013.01)

(58) Field of Classification Search
CPC ............ G06F 3/167; G06F 3/147; G06F 3/16; G06Q 20/20; G06Q 30/06; G09B 21/008; G09B 21/006; G09B 21/00

USPC .......................................................... 705/24
See application file for complete search history.

(56) References Cited

U.S. PATENT DOCUMENTS

| | | | | |
|---|---|---|---|---|
| 6,061,666 A * | 5/2000 | Do | ..................... | G06Q 20/1085 235/379 |
| 6,327,575 B1 * | 12/2001 | Katz | ...................... | G06F 3/147 235/7 R |
| 6,464,135 B1 * | 10/2002 | Cohen | ..................... | G07F 19/20 235/379 |
| 7,187,394 B2 * | 3/2007 | Chandane | ........... | G06F 3/04886 715/762 |
| 7,194,414 B1 * | 3/2007 | Savage | ................ | G06Q 20/382 705/64 |
| 7,413,115 B1 * | 8/2008 | Schuster | ............ | G06Q 20/1085 235/379 |
| 7,793,834 B2 * | 9/2010 | Hachey | .................. | G06K 19/06 235/380 |
| 8,949,746 B2 * | 2/2015 | Marzke | ................... | G06F 3/167 715/865 |
| 9,922,488 B2 * | 3/2018 | Joshi | ....................... | G07F 9/001 |
| 10,489,833 B2 * | 11/2019 | Shennib | ................ | H04R 25/30 |
| 10,607,213 B2 * | 3/2020 | Howe | .................... | G06Q 20/20 |
| 2011/0184824 A1 * | 7/2011 | George | ..................... | G01D 5/39 705/24 |
| 2014/0244412 A1 * | 8/2014 | Davis | ................... | G09B 21/006 705/17 |

(Continued)

*Primary Examiner* — Andrew Joseph Rudy
(74) *Attorney, Agent, or Firm* — Hovey Williams LLP

(57) ABSTRACT

Methods and systems for facilitating transactions by visually-impaired cardholders are provided herein. In particular, a method for performing a transaction using a visually-impaired payment system is provided that includes a payment application with a visually-impaired functionality, which may be activated so as to provide auditory instructions and/or enlarged text instructions to a visually-impaired cardholder.

17 Claims, 5 Drawing Sheets

(56) References Cited

U.S. PATENT DOCUMENTS

| | | | |
|---|---|---|---|
| 2015/0199719 A1* | 7/2015 | Gnasasambandam | G06Q 30/0245 705/14.54 |
| 2016/0148182 A1* | 5/2016 | Graine | G06Q 20/401 705/16 |
| 2018/0253216 A1* | 9/2018 | Beene | G06F 3/04897 |
| 2019/0139041 A1* | 5/2019 | Mokhasi | G07F 19/201 |
| 2019/0180015 A1* | 6/2019 | Hughes | G10L 13/00 |
| 2019/0392453 A1* | 12/2019 | Agrawal | G06Q 20/341 |

* cited by examiner

SYSTEM AND METHODS FOR PERFORMING A VISUALLY-IMPAIRED TRANSACTION

FIELD OF THE DISCLOSURE

The field of the disclosure relates generally to payment systems and methods for visually-impaired transactions and, more particularly, to systems and methods for providing audible and/or visual instructions to a visually-impaired cardholder from a digital wallet.

BACKGROUND

People with visual-based disabilities generally have difficulties carrying out commercial transactions and working with existing payment applications in today's retail settings. Typically, these transactions are not designed to facilitate the needs of visually-impaired individuals. Consequently, people with visual disabilities may struggle at Point-of-Sale (POS) devices because they can't adequately communicate or interact with these devices, thereby resulting in an unpleasant shopping experience.

Despite the advancements made to assist visually-impaired individuals, further advancements are needed in regard to payment systems and applications.

BRIEF DESCRIPTION

This summary is not intended to identify essential features of the present invention and is not intended to be used to limit the scope of the claims. These and other aspects of the present invention are described below in greater detail.

In one or more embodiments, a computer-implemented method performing a visually-impaired transaction is provided. Generally, the method comprises the steps of: (a) starting a payment application on a cardholder computing device, wherein the payment application comprises a visually-impaired functionality; (b) activating the visually-impaired functionality on the payment application; (c) transmitting a payment credential from the payment application to a point-of-sale device; and (d) receiving a visually-friendly communication from the payment application, the point-of-sale device, or the payment application and the point-of-sale device.

In one or more embodiments, a visually-impaired payment system is provided. Generally, the visually-impaired payment system comprises: (a) a memory device for storing data; and (b) a processor communicatively coupled to the memory device. The processor is programmed to: (i) start a payment application on a cardholder computing device, wherein the payment application comprises a visually-impaired functionality; (ii) activate the visually-impaired functionality on the payment application; (iii) transmit a payment credential from the payment application to a point-of-sale device; and (iv) receive a visually-friendly communication from the payment application, the point-of-sale device, or the payment application and the point-of-sale device.

In one or more embodiments, a non-transitory computer-readable storage media having computer-executable instructions for facilitating a visually-impaired transaction is provided. When executed by at least one processor, the computer-executable instructions causes the processor to: (a) start a payment application on a cardholder computing device, wherein the payment application comprises a visually-impaired functionality; (b) activate the visually-impaired functionality on the payment application; (c) transmit a payment credential from the payment application to a point-of-sale device; and (d) receive a visually-friendly communication from the payment application, the point-of-sale device, or the payment application and the point-of-sale device.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
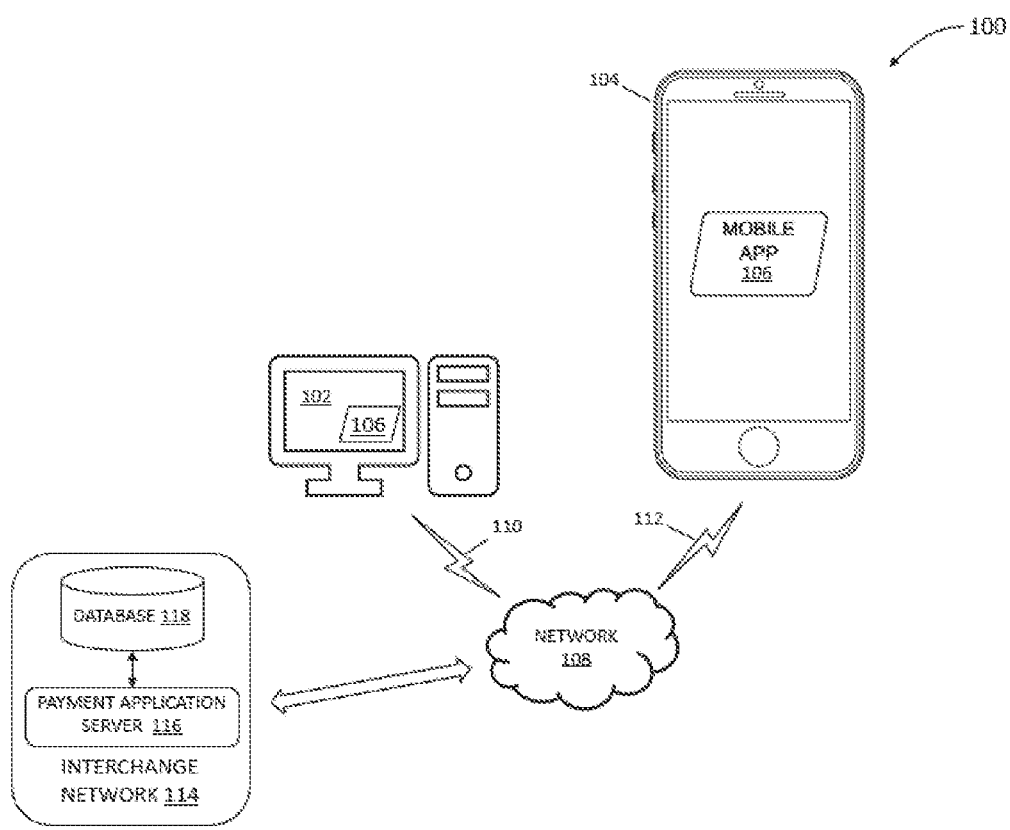
FIG. 1 is a simplified block diagram of an exemplary visually-impaired payment system in accordance with one embodiment of the present disclosure.

The figures depict exemplary embodiments for purposes of illustration only. The figures are not intended to limit the present invention to the specific embodiments they depict. One skilled in the art will readily recognize from the following discussion that alternative embodiments of the systems and methods illustrated herein may be employed without departing from the principles of the invention described herein.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled. It is contemplated that the disclosure has general application to providing digital data streams to visually-impaired devices in industrial, commercial, and residential applications.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments but is not necessarily included. Thus, particular implementations of the present disclosure can include a variety of combinations and/or integrations of the embodiments described herein.

Visually-impaired cardholders generally experience many difficulties when carrying out commercial transactions with most POS devices in today's retail settings. Typically, most POS devices are not designed to facilitate the needs of visually-impaired individuals. Furthermore, existing payment applications also lack the technical components required to meet the needs of a visually-impaired cardholder. However, the system and methods of the present invention are able to overcome these shortcomings.

The present invention generally relates to systems and methods for providing assistance to a disabled cardholder from a digital wallet application on a cardholder's device. As described further below, the digital wallet payment application on the cardholder's device may contain a visually-impaired functionality that can be enabled by the disabled cardholder. This disability functionality allows the disabled cardholder to indicate their disabilities (e.g., visually-impaired). Consequently, this will cause the digital wallet payment application on the cardholder's device to alter any ongoing communications with a merchant device (e.g., a point-of-sale device) in a way so as to facilitate the visually-impaired cardholder's needs. For example, when the visually-impaired functionality is enabled on the digital wallet payment application, all communications between the cardholder's device and the merchant device may then be provided as enlarged text messages and/or auditory messages to the disabled cardholder.

FIG. 1 is a simplified block diagram of an exemplary visually-impaired payment system 100 in accordance with one embodiment of the present disclosure. The visually-impaired payment system 100 may be utilized by cardholders (not shown in FIG. 1) as part of a process of performing an electronic transaction facilitated by transmission of a selected digital stream to one or more of a cardholder computer system 102 and/or a cardholder mobile computing device 104, which the cardholder may use to transmit instructions from a digital wallet system or payment application 106 on which is stored payment account information and a visually-impaired functionality (e.g., a Masterpass® brand system; Masterpass is a registered trademark of Mastercard International Incorporated).

As illustrated in FIG. 1, the cardholder computer system 102 and/or the cardholder mobile computing device 104 are configured to communicate with a communications network 108 via a wireless signal 110 and a wireless signal 112, respectively. The communications network 108 includes, for example and without limitation, one or more of a local area network (LAN), a wide area network (WAN) (e.g., the Internet, etc.), a mobile network, a virtual network, and/or any other suitable public and/or private network capable of facilitating a wireless communication link with the cardholder computer system 102 and/or the cardholder mobile computing device 104. In some embodiments, the communications network 108 may include more than one type of network, such as a private payment transaction network provided by an interchange network 114 to merchant acquirers (not shown in FIG. 1) and payment card issuers (not shown in FIG. 1) and, separately, the public Internet, which may facilitate communication between a merchant (not shown in FIG. 1) and one or more of the cardholder computer systems 102 and/or cardholder mobile computing devices 104.

In the exemplary embodiment, the cardholder computer systems 102 and the cardholder mobile computing devices 104 may be any device capable of interconnecting to the Internet including mobile computing devices, such as a laptop or desktop computer, a web-based phone (e.g., a "smart phone"), a personal digital assistant (PDA), a tablet or phablet, a web-connectable appliance, a "smart watch" or other wearable device, or other web-connectable equipment. It should be understood that the visually-impaired payment system 100 may include any number of cardholder computer systems 102 and cardholder mobile computing devices 104.

The visually-impaired payment system 100 also includes a payment application server 116. The payment application server 116 includes at least one processor (not shown in FIG. 1) in communication with a database 118. The database 118 contains information on a variety of matters, including, for example, one or more cardholder profiles, payment account data for a cardholder's payment accounts, and other information described herein. In one embodiment, the database 118 is stored on the payment application server 116. In an alternative embodiment, the database 118 is stored remotely from the payment application server 116 and may be non-centralized. In the example embodiment, the payment application server 116 is integral to and/or associated with the payment or interchange network 114, which is described further herein.

In the example embodiment, the payment application server 116 receives payment card data for the cardholder's one or more payment cards from the cardholder via the cardholder computer systems 102 and the cardholder mobile computing devices 104. The payment card data is stored by the payment application server 116 in the database 118.

Embodiments described herein may relate to a transaction card system, such as a credit card payment system using the Mastercard® interchange network. (Mastercard is a registered trademark of Mastercard International Incorporated.) The Mastercard interchange network is a set of proprietary communications standards promulgated by Mastercard International Incorporated for the exchange of financial transaction data and the settlement of funds between financial institutions that are members of Mastercard International Incorporated.

Figure 2:
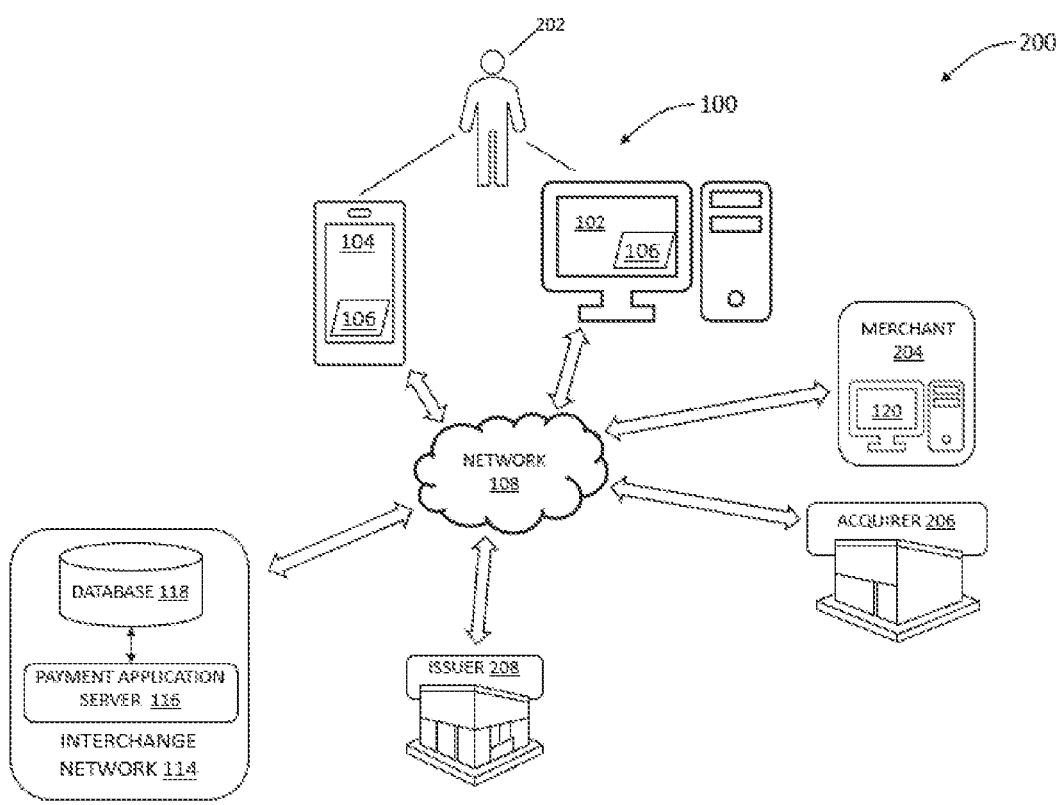
FIG. 2 is a simplified block diagram of an exemplary payment card network system including the visually-impaired payment system of FIG. 1.

FIG. 2 is a simplified block diagram of an exemplary payment card network system 200 including the visually-impaired payment system 100 in accordance with one embodiment of the present disclosure. The payment card network system 200 may be utilized by consumers and merchants as part of a process of initiating an authorization request and performing a transaction concurrent with delivery of goods or services as described herein via the interchange network 114. In addition, the payment card network system 200 is a transaction card account system including the cardholder mobile computing device 104 and the cardholder computer system 102, which the cardholder 202 may use either to conduct electronic transactions and/or record payments for electronic transactions related to purchase of a merchant's goods or services. It should be understood that the various components shown in FIG. 2 may be a subset of a larger system.

The payment card network system 200 enables payment-by-card transactions in which merchants 204, acquirers 206, and/or card issuers 208 do not need to have a one-to-one relationship. Although parts of the payment card network system 200 are presented in one arrangement, other embodiments may include the same or different parts arranged otherwise, depending, for example, on authorization processes for purchase transactions, communication between computing devices, etc.

In the example embodiment, the payment card network system 200 generally includes the cardholder mobile computing device 104, the cardholder computer system 102, merchants 204, acquirers 206, issuers 208, and the interchange network 114 coupled in communication via the communications network 108.

In a typical transaction card system, a financial institution called the "issuer" issues a transaction card, such as a credit card, to a consumer such as the cardholder 202, who uses the transaction card to tender payment for a purchase from the merchant 204. The cardholder 202 may input information from a transaction card into the cardholder mobile computing device 104 and/or cardholder computer system 102 and store the information as digital wallet data 306 (broadly, payment credentials) (shown in FIG. 3). The merchant 204 is typically associated with products, for example, and without limitation, goods and/or services, that are offered for sale and are sold to the cardholder 202. The merchant 204 includes, for example, a physical location and/or a virtual location such as an Internet-based store-front.

To accept payment from the cardholder 202, for example, with the digital wallet data 306, the merchant 204 must normally establish an account with a financial institution that is part of the payment card network system 200. This financial institution is usually called the "merchant bank," the "acquiring bank," or the acquirer 206. When the cardholder 202 submits payment for a purchase with the cardholder mobile computing device 104 and/or the cardholder computer system 102 using the digital wallet data 306, the merchant 204 requests authorization from the acquirer 206 for the purchase. The request may be performed over a telephone but is usually performed using a point-of-sale terminal that reads the cardholder's account information from a magnetic stripe, a chip, embossed characters on the transaction card, or digital wallet data and communicates electronically with the transaction processing computers of the acquirer 206. Alternatively, the acquirer 206 may authorize a third party to perform transaction processing on its behalf. In this case, the point-of-sale terminal will be configured to communicate with the third party. Such a third party is usually called a "merchant processor," an "acquiring processor," or a "third party processor."

Using the interchange network 114, computers of the acquirer 206 or merchant processor will communicate with computers of the issuer 208 to determine whether the cardholder's account is in good standing and whether the purchase is covered by the cardholder's available credit line. Based on these determinations, the request for authorization will be declined or accepted. If the request is accepted, an authorization code is issued to the merchant 204.

When a request for authorization is accepted, the available credit line of the cardholder's account is decreased. Normally, a charge for a payment card transaction is not posted immediately to the cardholder's account because bankcard associations, such as Mastercard International Incorporated, have promulgated rules that do not allow the merchant 204 to charge, or "capture," a transaction until the purchased goods are shipped or the purchased services are delivered. However, with respect to at least some debit card transactions, a charge may be posted at the time of the transaction. When the merchant 204 delivers the purchased products, the merchant 204 captures the transaction, for example, by appropriate data entry procedures on a point-of-sale terminal. This may include bundling of approved transactions daily for standard retail purchases. If the cardholder 202 cancels a transaction before it is captured, a "void" is generated. If the cardholder 202 returns goods after the transaction has been captured, a "credit" is generated. The interchange network 114 and/or the issuer 208 stores the transaction card information, such as, and without limitation, a type of merchant, a merchant identifier, a location where the transaction was completed, an amount of purchase, and a date and time of the transaction, in the database 118.

After a purchase has been made, a clearing process occurs to transfer additional transaction data related to the purchase among the parties to the transaction, such as the acquirer 206, the issuer 208, and the interchange network 114. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by the issuer 208, the cardholder's account is decreased. Normally, a charge is posted immediately to the cardholder's account. The interchange network 114 transmits the approval to the acquirer 206 for distribution of goods/services or information, or cash in the case of an automated teller machine (ATM).

After a transaction is authorized and cleared, the transaction is settled among the merchant 204, the acquirer 206, and the issuer 208. Settlement refers to the transfer of financial data or funds among the merchant's account, the acquirer 206, and the issuer 208 related to the transaction. Usually, transactions are captured and accumulated into a "batch," which is settled as a group. More specifically, a transaction is typically settled between the issuer 208 and the interchange network 114, and then between the interchange network 114 and the acquirer 206, and then between the acquirer 206 and the merchant 204. It should be appreciated that more or less information related to transactions, as part of either authorization, clearing, and/or settling, may be included in the transaction data and stored within the database 118, at the merchant 204, the acquirer 206, the payment network 112, and/or the issuer 208. Further, transaction data, unrelated to a particular payment account, may be collected by a variety of techniques, and similarly stored within the database 118.

In some embodiments, cardholders 202 involved in the transactions described herein may be prompted to agree to legal terms associated with their payment accounts, for example, during enrollment in such payment accounts, etc. As such, the cardholder 202 may voluntarily agree to allow the merchants 204, the issuers 208, the interchange network 114, etc., to utilize data collected during enrollment and/or collected relating to processing the transactions, subsequently for one or more of the purposes described herein.

As shown in FIG. 2, the interchange network 114 includes the payment application server 116, which is, for example, and without limitation, a server, a network of multiple computing devices, a virtual computing device, or the like. In addition, in some embodiments, the payment card network system 200 may also include one or more merchant or client sub-systems 120 (also referred to as client systems or merchant systems) coupled in communication to the payment application server 116. The client systems 120 are computers including, for example, a web browser and a memory device, such that the payment application server 116 is accessible to the client systems 120 using, for example, the Internet. The client systems 120 are interconnected to the Internet through one or more interfaces including a network, such as a local area network (LAN) or a wide area network (WAN), dial-in-connections, cable modems, and special high-speed ISDN lines. The client systems 120 can be any device capable of interconnecting to the Internet including, for example, a web-based smartphone, a personal digital assistant (PDA), or any other web-based connectable equipment.

As described above, the payment card network system 200 includes one or more cardholder computer systems 102 that are connected to the payment application server 116, and in some embodiments, may be connected to the client systems 120. The cardholder computer systems 102 are interconnected to the Internet through one or more interfaces including a network, such as a local area network (LAN) or a wide area network (WAN), dial-in-connections, cable modems, wireless modems, and special high-speed ISDN lines. The cardholder computer systems 102 can be any computing device capable of interconnecting to the Internet and including an input device capable of reading or storing information from a user's financial transaction card, including the digital wallet data 306.

Furthermore, as described above, the payment card network system 200 includes at least one cardholder mobile computing device 104 (e.g., a smartphone or other computing device used by the consumer to complete transactions), which is configured to communicate with the payment application server 116. In one embodiment, the cardholder mobile computing device 104 is associated with or controlled by a consumer making a purchase using a transaction card account and the payment card network system 200. In the example embodiment, the cardholder mobile computing device 104 is configured to communicate with the payment application server 116 to transmit, for example, and without limitation, the cardholder's account access credentials and/or transaction data to the payment application server 116. The cardholder mobile computing device 104 is configured to communicate with the payment application server 116 using various outputs including, for example, radio frequency communication, near field communication (NFC), network-based communication, and the like.

The payment application server 116 is connected to the database 118. In one embodiment, the database 118 is stored on the payment application server 116 and can be accessed by users at one of the client systems 120 by logging onto the payment application server 116 through one of the client systems 120. The database 118 may store transaction data generated as part of sales activities conducted over the bankcard network including data relating to merchants, account holders or customers, and purchases. The database 118 may also store account data including at least one of a user name, a user address, an account number, and other account identifiers. The database 118 may also store merchant data including a merchant identifier that identifies each merchant registered to use the payment account card network, and instructions for settling transactions including merchant bank account information. The database 118 may also store primary account numbers (PANs) or bank account numbers for various parties including merchants and customers, along with payment verification identifiers and other data necessary to implement the system and processes described herein.

Figure 3:
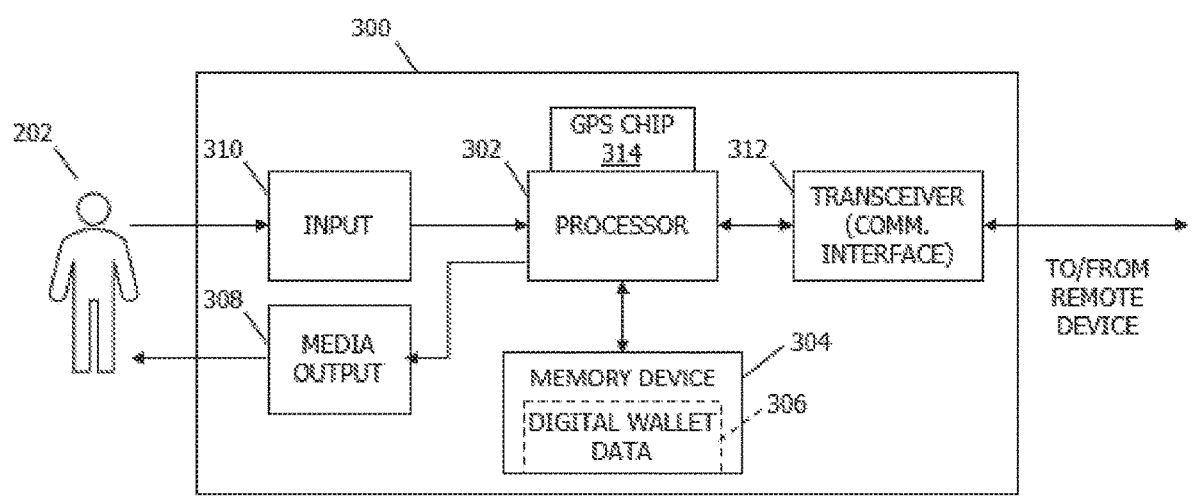
FIG. 3 is a block diagram illustrating an example of a user computing system, such as a cardholder mobile computing device shown in FIG. 1.

FIG. 3 is an example configuration of a user system 300 operated by a user, such as the cardholder 202 (shown in FIG. 2). In some embodiments, the user system 300 is the cardholder computer system 102 (shown in FIG. 1), the cardholder mobile computing device 104 (shown in FIG. 1), and/or a client system 120 (shown in FIG. 2).

In the example embodiment, the user system 300 includes one or more processors 302 for executing instructions. In some embodiments, executable instructions are stored in a memory device 304. The processor 302 may include one or more processing units arranged, for example, in a multi-core configuration. The memory device 304 is any device allowing information such as the digital wallet data 306, executable instructions, and/or written works to be stored and retrieved. The memory device 304 includes one or more computer readable media.

In one example embodiment, the processor 302 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

A location of the user system 300 can be obtained through conventional methods, such as a location service (e.g., global positioning system (GPS) service) in the user system 300, "ping" data that includes geotemporal data, from cell location register information held by a telecommunications provider to which the user system 300 is connected, and the like. For example, in one suitable embodiment, a GPS chip 314 can be part of or separate from the processor 302 to enable the location of the user system 300 to be determined.

The user system 300 also includes at least one media output component 308 for presenting information to the cardholder 202. The media output component 308 is any component capable of conveying information to the cardholder 202. In some embodiments, the media output component 308 includes an output adapter such as a video adapter and/or an audio adapter. The output adapter is operatively coupled to the processor 302 and operatively connectable to an output device such as a display device, a liquid crystal display (LCD), organic light emitting diode (OLED) display, or "electronic ink" display, and/or an audio output device, such as an integrated speaker and the like.

In one example embodiment, the media output component 308 includes an integrated display, which can include, for example, and without limitation, a liquid crystal display (LCD), an organic light emitting diode (OLED) display, or an "electronic ink" display. In some embodiments, the integrated display may optionally include a touch controller for support of touch capability. In such embodiments, a cardholder mobile computing device 104 may detect a person's presence by detecting that the person has touched the integrated display on the cardholder mobile computing device 104.

In some embodiments, the user system 300 includes an input device 310 for receiving input from the cardholder 202. The input device 310 may include, for example, a touch sensitive panel, a touch pad, a touch screen, a stylus, a gyroscope, an accelerometer, a position detector, a keyboard, a pointing device, a mouse, and/or an audio input device (e.g., a microphone). A single component such as a touch screen may function as both an output device of the media output component 308 and the input device 310, as described above. The user system 300 may also include a transceiver 312 (broadly, a communication interface), which is communicatively connectable to the network 108 (shown in FIG. 1) and/or a remote device such as the merchant client system 120 (shown in FIG. 2). The transceiver 312 may include, for example, a wired or wireless network adapter or a wireless data transceiver for use with radio frequency communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 304 are, for example, computer readable instructions for providing a user interface to the cardholder 202 via the media output component 308 and, optionally, receiving and processing input from the input device 310. A user interface may include, among other possibilities, a web browser and/or the payment application 106 (shown in FIG. 1). Web browsers enable users, such as the cardholder 202, to display and interact with media and other information typically embedded on a web page or a website from payment application server 116. The payment application 106 allows the cardholder 202 to interact with the payment application server 116 to perform electronic transactions.

Figure 4:
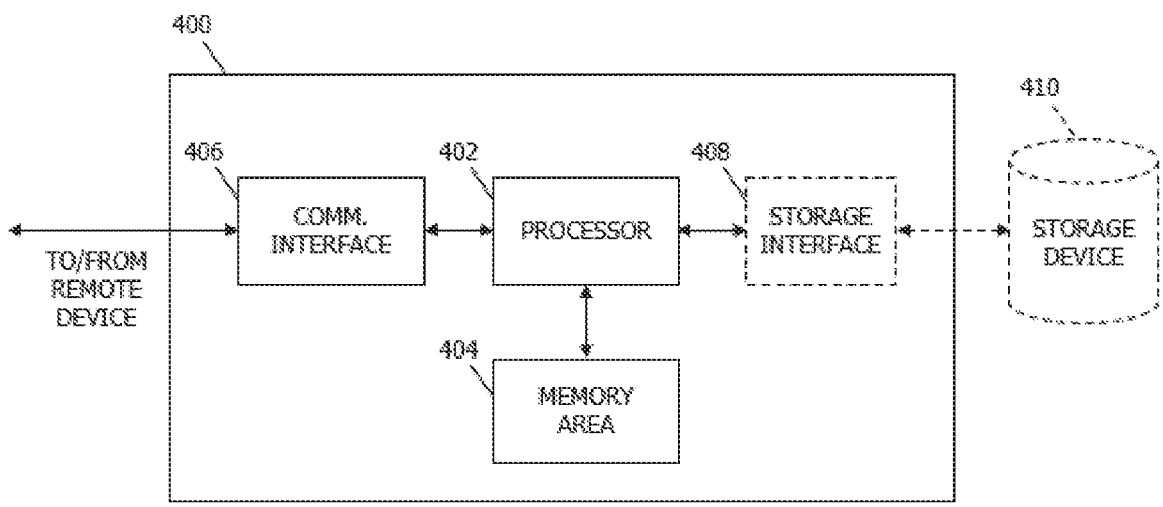
FIG. 4 is an example configuration of a server system, such as a payment application server shown in FIG. 1.

FIG. 4 is an example configuration of a server system 400, such as the payment application server 116 (shown in FIG. 1). In some embodiments, the server system 400 is substantially like the payment application server 116. In the example embodiment, the server system 400 includes a processor 402 for executing instructions. The instructions may be stored in a memory area 404, for example. The processor 402 includes one or more processing units (e.g., in a multi-core configuration) for executing the instructions. The instructions may be executed within a variety of different operating systems on the server system 400, such as UNIX, LINUX, Microsoft Windows®, etc. More specifically, the instructions may cause various data manipulations on data stored in a storage device 410 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

In one example embodiment, the processor 402 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

The processor 402 is operatively coupled to a communication interface 406 such that the server system 400 can communicate with a remote device such as a user system 300 or another server system 400. For example, the communication interface 406 may receive communications from the cardholder mobile computing device 104 and/or the cardholder computer system 102 via the Internet, as illustrated in FIG. 1.

The processor 402 is operatively coupled to the storage device 410. The storage device 410 is any computer-operated hardware suitable for storing and/or retrieving data. In some embodiments, the storage device 410 is integrated in the server system 400 and is like the database 118 (shown in FIG. 1). In other embodiments, the storage device 410 is external to the server system 400. For example, the server system 400 may include one or more hard disk drives as the storage device 410. In other embodiments, the storage device 410 is external to the server system 400 and may be accessed by a plurality of server systems 400. For example, the storage device 410 may include multiple storage units such as hard disks or solid-state disks in a redundant array of inexpensive disks (RAID) configuration. The storage device 410 may include a storage area network (SAN) and/or a network attached storage (NAS) system.

In some embodiments, the processor 402 is operatively coupled to the storage device 410 via a storage interface 408. The storage interface 408 is any component capable of providing the processor 402 with access to the storage device 410. The storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 402 with access to the storage device 410.

The memory area 404 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Figure 5:
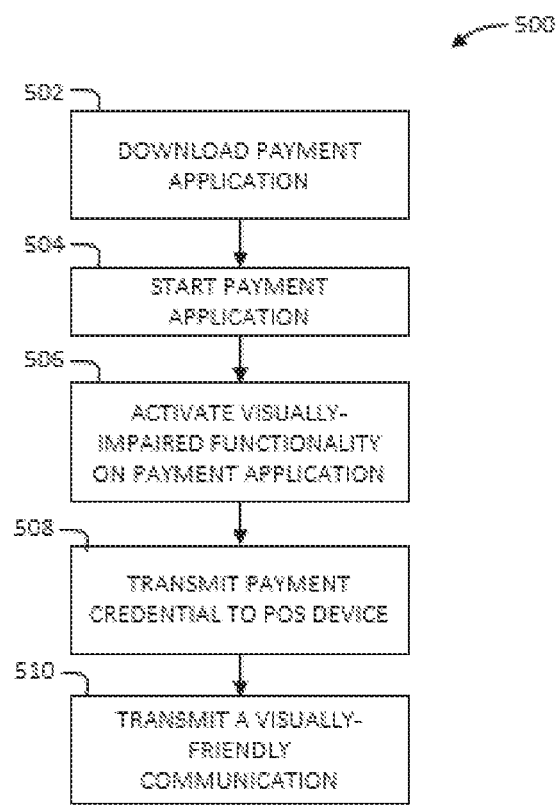
FIG. 5 is a flowchart illustrating an exemplary computer-implemented method for carrying out a visually-impaired transaction in accordance with one embodiment of the present disclosure.

FIG. 5 is a flowchart illustrating an exemplary computer-implemented method 500 for transmitting digital signals to a visually-impaired system for performing a transaction in accordance with one embodiment of the present disclosure. The operations described herein may be performed in the order shown in FIG. 5 or, unless stated otherwise or as may be apparent to those ordinarily skilled in the art, may be performed in a different order. Furthermore, according to certain aspects of the present invention, some operations may be performed concurrently as opposed to sequentially. In addition, according to certain aspects of the present invention, some operations may be optional.

The computer-implemented method 500 is described below, for ease of reference, as being executed by exemplary devices and components introduced with the embodiments illustrated in FIGS. 1-4. In one embodiment, the method 500 may be implemented by the cardholder computer system 102 and/or the cardholder mobile computing device 104

(each shown in FIG. 1). In the exemplary embodiment, the method 500 relates to the transmission of instructions for performing a visually-impaired transaction using the payment application 106 from the cardholder computer system 102 and/or the cardholder mobile computing device 104. While operations within the method 500 are described below regarding the cardholder computer system 102 and/or the cardholder mobile computing device 104, the method 500 may be implemented using the cardholder computer system 102 and/or the cardholder mobile computing device 104 as well as other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

Referring to operation 502, the cardholder 202 (shown in FIG. 2) downloads the payment application 106 comprising a visually-impaired functionality (shown in FIG. 1). For example, the cardholder 202 may connect to a payment application server, such as the payment application server 116 (shown in FIG. 1) that is part of the interchange network 114 described above, which may instruct the cardholder 202 to download the payment application 106 to the cardholder computer system 102 and/or the cardholder mobile computing device 104. Alternatively, the cardholder 202 may download the payment application 106 from a mobile application web store that is compatible with the cardholder computer system 102 and/or the cardholder mobile computing device 104. When the cardholder 202 uses the payment application 106, a direct link is established via a wireless connection, for example, via a Wi-Fi connection to the payment application server 116 via the communications network 108 (shown in FIG. 1).

The cardholder computer system 102 and/or the cardholder mobile computing device 104, such as a web-based smartphone, is configured to execute the payment application 106 with the visually-impaired functionality. In some embodiments, the payment application 106 may be stored in a cloud-based interface, which may include cloud storage capability as well as any cloud-based API that facilitates communication between the cardholder computer system 102 and/or the cardholder mobile computing device 104 and the payment application server 116. The payment application 106 with visually-impaired functionality facilitates transmitting and receiving payment card data between the cardholder mobile computing device 104 and the payment application server 116 for performing payment transactions.

At operation 504, the cardholder 202 executes or starts the payment application 106 (shown in FIG. 1) on the cardholder computer system 102 and/or the cardholder mobile computing device 104.

In certain embodiments, when the visually-impaired functionality of the payment application 106 is enabled, the payment application 106 may be configured to play pre-recorded audible instructions and messages to facilitate easy and precise execution of a payment transaction. The pre-recorded audible instructions may be stored locally on the cardholder computer system 102 and/or the cardholder mobile computing device 104, for example, in the memory device 304 (shown in FIG. 3). Alternatively, the pre-recorded audible instructions may be stored in the database 118 (shown in FIG. 1) and transmitted to payment application 106 in real-time as required. The pre-recorded audible instructions may be stored as digital audio signals, which are transmitted to a visually-impaired device 102 via the wireless connections 112 and/or 114. For example, these pre-recorded audible instructions may include: (i) a notice that the payment application 106 has been activated, (ii) a notice that the visually-impaired functionality of the payment application 106 has been enabled or disabled, (iii) a notice that the payment application 106 has linked with a POS device, (iv) instructions to provide payment information to the POS device, and/or (v) instructions on how to complete a commercial transaction with the linked POS device.

In certain embodiments, when the visually-impaired functionality of the payment application is enabled 106, the payment application 106 may be configured to provide enlarged readable text instructions and/or audible messages to the visually-impaired individual to thereby facilitate easy and precise execution of a payment transaction. For example, the payment application 106 may convert all transactional information regarding the payment transaction via processor 302 into enlarged readable text form and/or audible form for the cardholder's review. Additionally or alternatively, when the visually-impaired functionality is enabled, the payment application 106 may also provide instructions to the POS device for the POS device to also provide and display all transactional information regarding the payment transaction in enlarged readable text form and/or audible form for the cardholder's review. Furthermore, when the visually-impaired functionality is enabled, the payment application 106 may also provide a "talk-to-text" function, which converts some or all of the cardholder's verbal instructions or requests into a text format, which may be submitted to the POS device.

As used herein, "enlarged" text refers to text that is larger than the standard text size provided by the payment application 106. In one or more embodiments, the enlarged text may be at least 110, 120, 130, 140, 150, 160, 170, 180, 190, or 200 percent larger (based on font size) than the standard text size provided by the payment application 106. The readable text can include, for example, receipts and other information associated with the payment transaction. This readable text may be stored locally on the cardholder computer system 102 and/or the cardholder mobile computing device 104, for example, in the memory device 304 (shown in FIG. 3). Alternatively, the readable text instructions may be stored in the database 118 (shown in FIG. 1) and transmitted to payment application 106 in real-time as required. The enlarged readable text and/or audible messages may be provided in real-time from the media output 308.

At operation 506, after the payment application 106 is started, the cardholder 202 may choose to enable the visually-impaired functionality of the payment application 106. For example, the payment application 106 may include a settings or options menu that has an option for enabling/disabling the visually-impaired functionality of the payment application 106. Additionally or alternatively, in various embodiments, the payment application 106 may include a voice-activated setting that allows the cardholder to enable/disable the visually-impaired functionality of the payment application 106 by using only verbal instructions from the cardholder. When the visually-impaired functionality is enabled in the settings or options menu, the payment application 106 automatically carries out one or more of the actions described above, including transmitting and converting all transactional information into enlarged readable text during use of the payment application 106 and/or transmitting audible instructions and messages as digital audio signals to the payment application 106. When the visually-impaired functionality is disabled in the settings or options menu, the payment application 106 does not carry out any of the visually-impaired functionalities described herein.

In another embodiment, the payment application 106 may include a visually-impaired functionality setting that may be triggered (e.g., pressed, swiped, voice-activated, etc.) to start, stop, and/or pause the visually-impaired functionality in real-time. For example, if the cardholder 202 determines that the ambient environment does not require the use of the visually-impaired functionality, the cardholder may choose to not enable the visually-impaired functionality for a particular transaction. In certain embodiments, the visually-impaired functionality of the payment application 106 may be voice activated due to the visual impairments of the cardholder 202. Thus, in such embodiments, the cardholder 202 may enable the visually-impaired functionalities of the payment application 106 based upon verbal instructions from the cardholder.

When activating the visually-impaired functionality in the payment application 106, the visually-impaired functionality of the payment application 106 may allow the cardholder 202 to select amongst a designated listing of disabilities (e.g., hearing-impaired, visually-impaired, etc.) so that the payment application 106 may institute specific actions based on the selected disability. For example, if the cardholder selects "visually-impaired," then the payment application 106 may: (i) provide all communications between the payment application 106 and the merchant 204 in the form of enlarged text messages and/or as auditory messages provided from the media output 308 of the cardholder's device; (ii) instruct the POS device to display all relevant communications in the form of enlarged text messages and/or as auditory messages for the cardholder's review (if the POS device is capable of providing enlarged text messages and/or auditory messages); and/or (iii) use a "talk-to-text" function to convert some or all of cardholder's verbal instructions into text, which may be sent to the POS device for merchant's review. Furthermore, the cardholder may select what specific actions that the payment application 106 can carry out based on the cardholder's selected disability, such as whether to provide all communications in enlarged text form and/or provide all communications in auditory form. For instance, the cardholder may instruct the payment application to provide all communications between the payment application 106 and the merchant 204 in the form of enlarged text messages, but not in the form of auditory messages. The above selections may be changed in real-time by selecting (e.g., pressing, swiping, voice-activating, etc.) the corresponding setting associated with these specific disability functions on the payment application 106. Thus, for example, the cardholder could provide verbal instructions to the payment application 106 to activate the setting for only providing auditory instructions.

At operation 508, the payment application 106 initially transmits a payment credential to a POS device via the payment application server 116 to thereby initiate the commercial transaction. When the visually-impaired functionality of the payment application 106 is enabled, the payment application 106 may provide audible and/or enlarged text instructions to the cardholder 202 instructing the cardholder on a first step for creating a digital wallet account (e.g., a Masterpass account) and/or for performing a payment transaction using the payment application 106 (i.e., the digital wallet). For example, and without limitation, the audible and/or enlarged text instructions may step the cardholder 202 through an account generation process, instructing the cardholder 202 to input cardholder information such as name, address, login credentials, payment account information, etc. For performing a transaction, the audible and/or enlarged text instructions may instruct the cardholder 202 to select a payment account, for example, if two or more payments accounts are associated with the digital wallet or step the cardholder through the process of completing the transaction at the merchant point-of-sale ("POS") device (not shown). It should be noted that the POS device can include devices operated by a sales clerk or autonomous POS devices (e.g., a kiosk). The cardholder 202 may use the payment application 106 to transmit a payment credential (e.g., the digital wallet data 306) to the merchant POS device to perform a payment transaction.

The audible instructions and/or enlarged text messages may instruct the visually-impaired cardholder to place the cardholder mobile computing device 104 near the POS device. When the POS device and the cardholder mobile computing device 104 make a connection, the audible and/or enlarged text instructions may indicate such to the cardholder 202. If there is an error or if a connection to the POS device is not sensed in a predetermined period, the payment application 106 may transmit an instruction to reconnect the cardholder mobile computing device 104 to the POS device. After receiving the payment credential, the POS device initiates the payment transaction. After receiving a payment authorization response message, the POS device may provide audible and/or enlarged text instructions to the cardholder indicating that the transaction was successful. If the transaction cannot be completed, the audible and/or enlarged text instructions may notify the user of the incomplete transaction and provide one or more reasons, which may typically be provided by the interchange network to the POS device. It is noted that the above-described instructions are merely examples and that many different instructions may be pre-recorded and stored for playback through the payment application 106.

At operation 510, at least one visually-friendly communication may be transmitted between the payment application 106 and the merchant POS device. These visually-friendly communications may be automatically transmitted over the network 108 via the processor 302. The visually-friendly communications may include any of the visually-friendly communications provided by the visually-impaired functionality of the payment application 106. For example, the visually-friendly communication may include transactional information and/or instructions from the cardholder and/or POS device that have been converted into enlarged readable text messages and/or audible instructions for the cardholder's benefit. These visually-friendly communications may adequately describe the ongoing commercial transactions, thereby allowing a visually-impaired cardholder to carry out and finish a payment transaction at any accommodating venue. Furthermore, these visually-friendly communications may contain any or all information regarding the ongoing commercial transaction. Additionally, these visually-friendly communications can include instructions or specific requests from the cardholder to the POS device, which have been converted by the payment application 106 using a "talk-to-text" functionality. In such embodiments, the cardholder may verbally issue one or more questions or requests to the merchant 204 and the payment application 106 may convert these verbal instructions into text form and send them to the POS device.

In various embodiments, the cardholder 202 may optionally trigger (e.g., by swiping and/or verbal instructions) the visually-impaired functionality setting of the payment application 106 to pause the audible and/or enlarged text instructions and, optionally, the operation of the payment application 106. For example, and without limitation, the cardholder 202 may determine that the audible and/or enlarged text instructions are unnecessary and choose to disable the instructions during a transaction. Generally, in various embodiments, audibly triggering the visually-impaired setting of the payment application 106 may present to the user a notification that the audible and/or enlarged text instructions will be disabled until reenabled by the cardholder while continuing the payment transaction.

In another embodiment, the cardholder 202 may wish to pause the entire transaction for an indeterminate period. For example, and without limitation, the cardholder 202 may be interrupted by a sales clerk of the merchant or may become otherwise distracted while using the payment application 106. The visually-impaired setting of the payment application 106 may be triggered (e.g., by swiping and/or verbal instructions) to interrupt the process flow of the payment application 106, pausing the process until the cardholder 202 can subsequently focus his or her attention on the payment application. After triggering the visually-impaired setting of the payment application 106 (e.g., by swiping and/or verbal instructions), the payment application 106 may present to the user an audible and/or enlarged text notification that the audible instructions will be disabled until reenabled by the cardholder and subsequently present an audible option to pause the transaction process. As such, the visually-impaired setting of the payment application 106 may perform different actions at different points of use of the payment application 106. When the payment application 106 is started, the visually-impaired setting of the payment application 106 may enable or disable the audible and/or enlarged text instructions function and, during a transaction or account setup process, the visually-impaired setting of the payment application 106 may be used to pause the process for an indeterminate period.

The payment application 106 may disconnect from the wireless connections 112 and/or 114 after completion of a transaction. For example, and without limitation, in one embodiment, the payment application 106 may automatically disconnect from the wireless connections 112 and/or 114 at the termination of a payment transaction. After a predetermined period following the termination request, the payment application 106 may automatically disconnect from the wireless connections 112 and/or 114.

ADDITIONAL CONSIDERATIONS

Any actions, functions, operations, and the like recited herein may be performed in the order shown in the figures and/or described above or, unless stated otherwise or as may be apparent to those ordinarily skilled in the art, may be performed in a different order. Furthermore, according to certain aspects of the present invention, some operations may be performed concurrently as opposed to sequentially. Although the methods are described above, for the purpose of illustration, as being executed by an example system and/or example physical elements, it will be understood that the performance of any one or more of such actions may be differently distributed without departing from the spirit of the present invention.

A computer-readable storage media or medium comprising a non-transitory medium may include an executable computer program stored thereon and for instructing one or more processing elements to perform some or all of the operations described herein, including some or all of the operations of the computer-implemented method. The computer program stored on the computer-readable medium may instruct the processor and/or other components of the system to perform additional, fewer, or alternative operations, including those discussed elsewhere herein.

All terms used herein are to be broadly interpreted unless otherwise stated. For example, the term "payment card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

The terms "processor," "processing element," and the like, as used herein, may, unless otherwise stated, broadly refer to any programmable system including systems using central processing units, microprocessors, microcontrollers, reduced instruction set circuits (RISC), application specific integrated circuits (ASIC), logic circuits, and any other circuit or processor capable of executing the functions described herein. The above examples are example only and are thus not intended to limit in any way the definition and/or meaning of the term "processor." In particular, a "processor" may include one or more processors individually or collectively performing the described operations. In addition, the terms "software," "computer program," and the like, may, unless otherwise stated, broadly refer to any executable code stored in memory for execution on mobile devices, clusters, personal computers, workstations, clients, servers, and a processor or wherein the memory includes read-only memory (ROM), electronic programmable read-only memory (EPROM), random access memory (RAM), erasable electronic programmable read-only memory (EEPROM), and non-volatile RAM (NVRAM) memory. The above memory types are example only and are thus not limiting as to the types of memory usable for storage of a computer program.

The terms "computer," "computing device," "computer system," and the like, as used herein, may, unless otherwise stated, broadly refer to substantially any suitable technology for processing information, including executing software, and may not be limited to integrated circuits referred to in the art as a computer, but may broadly refer to a microcontroller, a microcomputer, a programmable logic controller (PLC), an application specific integrated circuit, and other programmable circuits, and these terms are used interchangeably herein.

The term "network," "communications network," and the like, as used herein, may, unless otherwise stated, broadly refer to substantially any suitable technology for facilitating communications (e.g., GSM, CDMA, TDMA, WCDMA, LTE, EDGE, OFDM, GPRS, EV-DO, UWB, Wi-Fi, IEEE 802 including Ethernet, WiMAX, and/or others), including supporting various local area networks (LANs), personal area networks (PAN), or short-range communications protocols.

The term "communication component," "communication interface," and the like, as used herein, may, unless otherwise stated, broadly refer to substantially any suitable technology for facilitating communications, and may include one or more transceivers (e.g., WWAN, WLAN, and/or WPAN transceivers) functioning in accordance with IEEE standards, 3GPP standards, or other standards, and configured to receive and transmit signals via a communications network.

The term "memory area," "storage device," and the like, as used herein, may, unless otherwise stated, broadly refer to substantially any suitable technology for storing information, and may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Although the invention has been described with reference to the one or more embodiments illustrated in the figures, it is understood that equivalents may be employed, and substitutions made herein without departing from the scope of the invention as recited in the claims.

Having thus described one or more embodiments of the invention, what is claimed as new and desired to be protected by Letters Patent includes the following:

What is claimed is:

1. A computer-implemented method performed on a cardholder mobile smartphone, the method comprising the steps of:
    starting a payment application on the cardholder mobile smartphone, wherein the payment application comprises a visually-impaired functionality and an input icon for activating the visually-impaired functionality, the input icon presented for display on a user interface of the cardholder mobile smartphone;
    receiving input from the input icon upon the input icon being triggered;
    in response to the input, activating the visually-impaired functionality on the payment application;
    transmitting digital wallet data from the payment application to a point-of-sale device;
    upon activation of the visually-impaired functionality, transmitting a POS instruction to the point-of-sale device to cause the point-of-sale device to display all transactional information in a first enlarged readable text form;
    receiving a visually-friendly communication from the payment application; and
    presenting the visually-friendly communication via the cardholder mobile smartphone.

2. The computer-implemented method of claim 1, wherein the visually-impaired functionality comprises converting all the transactional information into one or more audible instructions.

3. The computer-implemented method of claim 2, further comprising receiving a digital audio signal via a wireless communication protocol, the digital audio signal comprising an audible instruction.

4. The computer-implemented method of claim 1, wherein the visually-impaired functionality comprises converting all the transactional information into a second enlarged readable text form.

5. The computer-implemented method of claim 4, wherein receiving the visually-friendly communication comprises receiving one or more text messages in the second enlarged readable text form on the cardholder mobile smartphone from the payment application.

6. The computer-implemented method of claim 1, wherein transmitting the digital wallet data comprises linking the cardholder mobile smartphone to the point-of-sale device.

7. A visually-impaired payment system comprising:
    a cardholder mobile smartphone comprising:
        a display device;
        a memory device for storing data, said memory device including thereon a POS instruction configured to cause a point-of-sale device to display all transactional information in a first enlarged readable text form; and
        a processor communicatively coupled to the memory device and the display device, wherein the processor is programmed to:
            start a payment application on the cardholder mobile smartphone, wherein the payment application comprises a visually-impaired functionality and an input icon for activating the visually-impaired functionality, the input icon displayed on the display device via a user interface of the cardholder mobile smartphone;
            receive input from the input icon upon the input icon being triggered;
            in response to the input, activate the visually-impaired functionality on the payment application;
            transmit digital wallet data from the payment application to the point-of-sale device;
            upon activation of the visually-impaired functionality, transmit the POS instruction to the point-of-sale device to cause the point-of-sale device to display all the transactional information in the first enlarged readable text form;
            receive a visually-friendly communication from the payment application; and p3 present the visually-friendly communication via the cardholder mobile smartphone.

8. The visually-impaired system of claim 7, wherein the processor is further programmed to transmit the digital wallet data from the payment application to the point-of-sale device upon linking the cardholder mobile smartphone to the point-of-sale device.

9. The visually-impaired system of claim 7, wherein the visually-impaired functionality comprises converting all the transactional information into one or more audible instructions.

10. The visually-impaired system of claim 9, wherein the processor is programmed to receive a digital audio signal via a wireless communication protocol, the digital audio signal comprising an audible instruction.

11. The visually-impaired system of claim 7, wherein the visually-impaired functionality comprises converting all the transactional information into a second enlarged readable text form.

12. The visually-impaired system of claim 11, wherein the processor is programmed to receive one or more text messages in the second enlarged readable text form on the cardholder mobile smartphone from the payment application.

13. A non-transitory computer-readable storage media having computer-executable instructions for facilitating a visually-impaired transaction, when executed by at least one processor, the computer-executable instructions cause the processor to:

start a payment application on a cardholder mobile smartphone, wherein the payment application comprises a visually-impaired functionality and an input icon for activating the visually-impaired functionality, the input icon presented for display on a user interface of the cardholder mobile smartphone;

receive input from the input icon upon the input icon being triggered;

in response to the input, activate the visually-impaired functionality on the payment application;

transmit digital wallet data from the payment application to a point-of-sale device;

upon activation of the visually-impaired functionality, transmit a POS instruction to the point-of-sale device to cause the point-of-sale device to display all transactional information in a first enlarged readable text form;

receive a visually-friendly communication from the payment application; and present the visually-friendly communication via the cardholder mobile smartphone.

14. The non-transitory computer-readable storage media of claim 13, wherein the visually-impaired functionality comprises converting all the transactional information into a second enlarged readable text form.

15. The non-transitory computer-readable storage media of claim 13, wherein the computer-executable instructions further cause the processor to receive one or more text messages in the second enlarged readable text form on the cardholder mobile smartphone from the payment application.

16. The non-transitory computer-readable storage media of claim 13, wherein the visually-impaired functionality comprises converting all the transactional information into one or more audible instructions.

17. The non-transitory computer-readable storage media of claim 13, wherein the computer-executable instructions further cause the processor to receive a digital audio signal via a wireless communication protocol, the digital audio signal comprising an audible instruction.

\* \* \* \* \*